(No Model.)

G. H. CROSBY.
HYDRAULIC TRAP.

No. 280,355. Patented July 3, 1883.

Witnesses.
J. N. Piper
E. A. Pratt

Inventor.
Geo. Hannibal Crosby,
by R. H. Eddy atty.

UNITED STATES PATENT OFFICE.

GEORGE H. CROSBY, OF SOMERVILLE, MASSACHUSETTS.

HYDRAULIC TRAP.

SPECIFICATION forming part of Letters Patent No. 280,355, dated July 3, 1883.

Application filed January 23, 1883. (No model.)

*To all whom it may concern:*

Be it known that I, GEORGE HANNIBAL CROSBY, of Somerville, in the county of Middlesex, of the Commonwealth of Massachusetts, have invented a new and useful Improvement in Hydraulic Traps for Basins, Steam-Pressure Gages, &c.; and I do hereby declare the same to be described in the following specification and represented in the accompanying drawings, of which—

Figure 1:
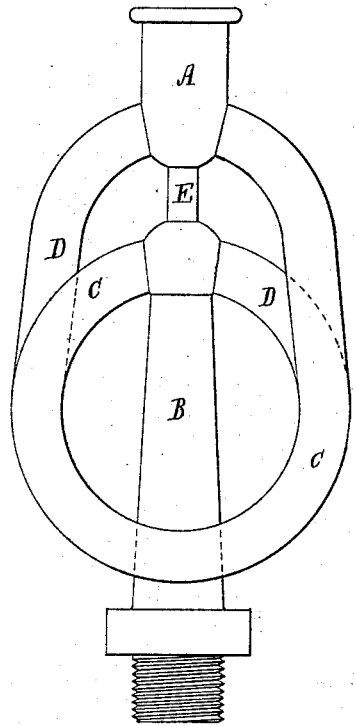
Figure 2:
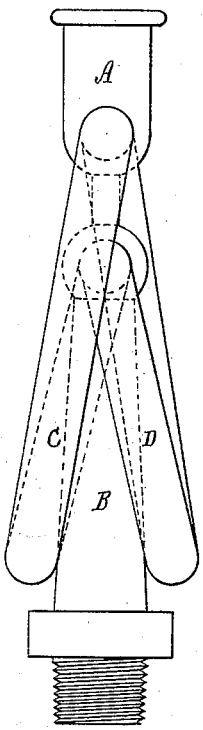
Figure 3:
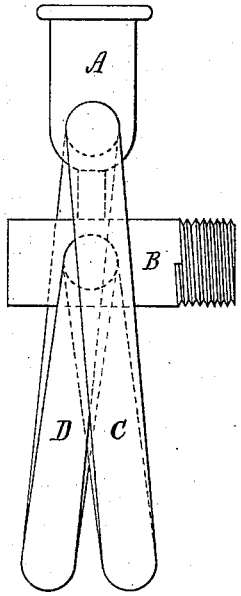

Figure 1 is a front elevation, and Fig. 2 an edge view, of a trap embodying my invention, the nature of which is defined in the claims hereinafter presented. Fig. 3 is an edge view of a trap of like kind, having a different arrangement of its educt relatively to that of the trap shown in Figs. 1 and 2.

The trap in question is a duplex or safety trap. Should one curved branch of my duplex trap be clogged or stopped, the other branch will generally be operative, and water will escape through it. Besides, as a trap for steam-pressure gages, it will hold double or very much more water than will the S-trap corresponding in size with that of one of the branches of my said duplex trap, all of which is very important or advantageous in preventing steam from entering the Bourdon expander of a steam-pressure gage, and thereby causing the gage to erroneously indicate the degree of pressure of the steam.

In the drawings, A is the induct, and B the educt, of the trap, they being connected by two hook-shaped branch pipes, C and D, arranged and curved in manner as represented. The two branch pipes, at their upper ends, are attached to and open into the tubular induct A, which, closed at its lower and open at its upper end, may be screw-threaded internally for connecting it to the induct of a pressure-gage or the educt of a sink or wash-basin. The two curved branch pipes, at their other ends, are attached to and open into the tubular educt B, at or near the closed upper end thereof, such educt, at its other end, being screw-threaded for fixing it to a boiler or an escape-conduit. The said induct A is an inverted thimble, the educt B being a hollow column closed at top.

For the purpose of strengthening the trap there may be a post or connection-piece, E, to unite the induct A to the top of the educt B.

In this trap, when applied to a basin or sink, water will stand in each of the branches to or about to a level of the lower parts of their mouths of discharge into the educt B, and should either branch become clogged by any matter deposited or getting accidentally in it, so as to impede or stop the flowage of water through it, the other branch will be operative, or will be free to discharge water into the educt.

When the trap is used in connection with a steam-pressure gage, the steam passing through the conduit B into the branches will condense therein, the water, by the steam, being forced upward within the branches into the Bourdon expander, after which the water in the branches will operate to prevent the steam from entering the Bourdon expander, though forcing the water into it, so as to expand it.

The trap, by supplying to the gage double or about double the quantity of water that a single-tube trap usually does, is advantageous in preventing the water from being reconverted into steam.

With this trap there is not the trembling or vibratory motion incident to the single-tube or S trap.

I claim—

1. The duplex safety-trap, substantially as described, consisting of the induct or inverted thimble A, the educt or hollow column B, closed at top, and the two hooked pipes C and D, arranged on opposite sides of the said column, and opening at their upper ends into the induct or thimble A and at their lower ends into the upper part of the said column B, all being as represented.

2. The trap consisting of the induct or inverted thimble A, the educt or hollow column B, their connection-post E, and the two hooked pipes C and D, arranged and adapted substantially and to operate as set forth.

GEORGE HANNIBAL CROSBY.

Witnesses:
R. H. EDDY,
E. B. PRATT.